(12) United States Patent
Palaoro

(10) Patent No.: US 10,814,680 B2
(45) Date of Patent: Oct. 27, 2020

(54) TIRE VALVE FOR A PNEUMATIC TIRE OF A VEHICLE

(71) Applicant: ALLIGATOR VENTILFABRIK GMBH, Giengen (DE)

(72) Inventor: Renato Palaoro, Heidenheim (DE)

(73) Assignee: WEGMANN AUTOMOTIVE GMBH, Veitshochheim (DE)

(*) Notice: Subject to any disclaimer, the term of this patent is extended or adjusted under 35 U.S.C. 154(b) by 458 days.

(21) Appl. No.: 15/580,665

(22) PCT Filed: Jun. 7, 2016

(86) PCT No.: PCT/EP2016/062840
§ 371 (c)(1),
(2) Date: Dec. 7, 2017

(87) PCT Pub. No.: WO2016/198373
PCT Pub. Date: Dec. 15, 2016

(65) Prior Publication Data
US 2018/0162184 A1    Jun. 14, 2018

(30) Foreign Application Priority Data

Jun. 8, 2015 (DE) .................. 10 2015 210 461

(51) Int. Cl.
*B60C 27/02* (2006.01)
*B60C 23/04* (2006.01)
(Continued)

(52) U.S. Cl.
CPC ...... *B60C 23/0494* (2013.01); *B60C 23/0496* (2013.01); *B60C 29/005* (2013.01); *B60C 29/02* (2013.01); *B60C 29/066* (2013.01)

(58) Field of Classification Search
CPC ............ B60C 23/0408; B60C 23/0494; B60C 23/0496; B60C 29/02; B60C 29/005; B60C 29/066
See application file for complete search history.

(56) References Cited

U.S. PATENT DOCUMENTS 5,884,131 A     3/1999 Shimizu et al.
6,557,406 B2 *  5/2003 Gabelmann ......... B60C 23/0408
                                           73/146.5
(Continued)

FOREIGN PATENT DOCUMENTS

DE    102004051574 A1    5/2005
EP      0 751 017        1/1997
(Continued)

OTHER PUBLICATIONS

International Search Report and Written Opinion dated Aug. 23, 2016 in PCT/EP2016/062840.

*Primary Examiner* — Scott A Browne
(74) *Attorney, Agent, or Firm* — Yakov Sidorin; Quarles & Brady LLP

(57) ABSTRACT

The invention relates to a tyre valve for a pneumatic tyre of a vehicle, having a valve stem extending from the air inlet end to the air outlet end and having an outside thread on its outside circumference and a collar at its air outlet end for a rim well carrying the pneumatic tyre and a fastening thread for an air pressure sensor or other device to be fastened to the valve stem and positioned inside the pneumatic tyre, exhibiting a union nut with an inside thread for screwing onto the outside thread in order to clamp the rim base between the union nut and the collar, with the valve stem being inserted through a rim bore, with a plastic valve cap, with a deformable element located on the outside circumference of the valve stem and/or an inside circumference of the union nut.

(Continued)

Figure 1:
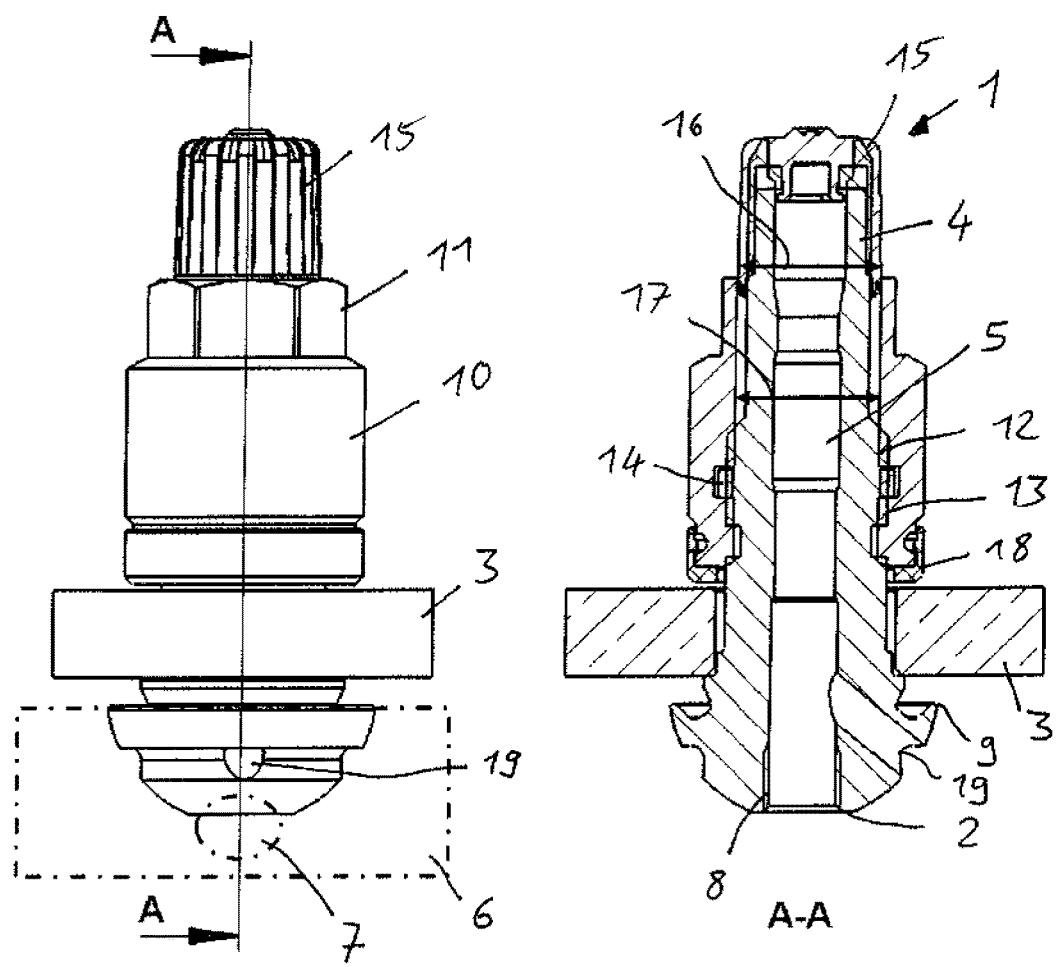

The tyre valve according to the invention is characterised in that the union nut and, if the deformation element is located on the inside circumference of the union nut, also the deformation element, exhibit a minimum inside diameter that exceeds the maximum outside diameter of the valve cap.

12 Claims, 4 Drawing Sheets

(51) Int. Cl.
  *B60C 29/00* (2006.01)
  *B60C 29/06* (2006.01)
  *B60C 29/02* (2006.01)

(56) References Cited

U.S. PATENT DOCUMENTS

2004/0178898 A1* 9/2004 Ito ................... B60C 23/0408
                                                              340/445
2008/0202659 A1* 8/2008 Hettle ................... B60C 29/02
                                                              152/415

FOREIGN PATENT DOCUMENTS

| EP | 1 277 601 | 1/2003 |
| WO | 2011/097823 | 8/2011 |
| WO | 2014/108926 | 7/2014 |

* cited by examiner

TIRE VALVE FOR A PNEUMATIC TIRE OF A VEHICLE

RELATED APPLICATIONS

The present application is a national phase filing under 35 U.S.C. § 371 of International Application No. PCT/EP2016/062840, titled "TYRE VALVE FOR A PNEUMATIC TYRE OF A VEHICLE," filed on Jun. 7, 2016, which claims the benefit of priority to German Patent Application No. 10 2015 210 461.3, filed on Jun. 8, 2015, the entire disclosures of which are expressly incorporated herein by reference.

The present invention relates to a tyre valve for a pneumatic tyre of a vehicle, in particular of a motor vehicle such as a utility or passenger vehicle.

Tyre valves of the generic type are used to pump compressed air into the pneumatic tyre of a motor vehicle or to release compressed air from the pneumatic tyre. In respect of the direction of air flow when the pneumatic tyre is pumped, such tyre valves will exhibit a corresponding air inlet side for the connection of a source of compressed air and an air outlet side for positioning inside the pneumatic tyre. The source of compressed air will generally be connected by means of an air pump or compressor clamping device that will be clamped onto the threaded end of the tyre valve stem on the air inlet side.

It has recently been proposed to connect the air pressure sensor for tyre pressure monitoring systems to the air outlet side of the tyre valve or to its corresponding valve stem. Such air pressure sensors will exhibit a housing that will, in accordance with an embodiment applying also to the present invention, be flexibly attached or attachable to the valve stem, to thereby press the housing onto the rim well or the rim supporting the pneumatic tyre. This will, in accordance with EP 1 277 601 A2, be achieved by means of a hollow-core screw as the fastener screwing into a valve bore of the valve stem and pressing the housing of the air pressure sensor against the rim well as it is tightened.

Since such fastening screws will have a free end positioned inside the pneumatic tyre or positioned on the side of the rim well facing the inside of the pneumatic tyre, EP 1 277 601 A2 proposes to enable tightening of a union nut against the rim and also tightening the fastening screw within a fastening bore against the valve stem on the side of the rim well facing away from the inside of the pneumatic tyre.

In accordance with the proposed solution the union nut will have a protrusion implemented as a predetermined breaking point on the inside, causing the union nut and valve stem to rotate together relative to the fastening screw as the union nut is at first screwed onto the valve stem with the fastening screw thus screwing into a threaded bore at the air outlet side of the valve stem, thereby pulling the air pressure sensor housing against the valve stem and, as the union nut continues to be screwed onto the outer valve stem thread, shearing off the predetermined breaking point element when a correspondingly higher torque is reached, whereafter the union nut will rotate relative to the valve stem and thereby tighten against the rim or the outside of the rim well to clamp the rim between the union nut and an end stop provided at the air outlet side of the valve stem.

EP 1 277 601 A2 exhibits a plastic valve cap in all its embodiments, extending beyond the inside diameter of the union nut due to its comparatively large maximum outer diameter as dictated by the required strength of material. EP 1 277 601 A2 nevertheless suggests fitting the union nut with a screwed on, more slender valve cap. This presupposes, however, that the valve cap, made of comparatively thin material, should be made of metal to achieve the required strength. Such comparatively thin metal caps will, however, easily corrode, especially in winter, permanently joining metal cap and valve stem. The road salt or thawing agents generally used in winter will exacerbate this problem when valve or valve cap are exposed to this.

The scope of the present invention is for this reason limited to tyre valves with plastic valve caps.

Based on EP 1 277 601 A2, WO 2014/108926 A1 proposes to provide the predetermined breaking point element on the valve stem instead of on the union nut, thereby allowing the use of standard union nuts.

Although the embodiments mentioned will in practice clearly simplify fastening the air pressure sensor to the rim well as compared to earlier embodiments that provide for tightening the fastening screw in the vicinity of the air outlet side of the valve stem, see EP 0 751 017 A2, for instance, the mentioned embodiments have the disadvantage that the interaction of the predetermined breaking point element on the valve stem and the predetermined breaking point element extending radially inward from the union nut will prevent screwing the union nut onto the valve stem without first removing the valve cap closing the valve bore at the air inlet side. Due to the high number of air pressure sensors workshops need to install and pressures of time, the necessary removal and later replacement of valve caps has proven a significant drawback. If, however, new tyre valves are supplied with separate valve caps to avoid unscrewing, a risk exists that the valve cap is lost in transport. A danger also exists that the air inlet opening of the valve will be soiled unless covered in transport with its cap.

The present invention therefore aims at developing a tyre valve with a plastic valve cap of the type described above that will not exhibit the disadvantages described.

The object of the invention is achieved by a tyre valve with the features described in Claim 1. The dependent claims describe advantageous and particularly practical embodiments of the invention.

A tyre valve according to the invention for a pneumatic tyre for a vehicle, especially a motor vehicle such as a utility motor vehicle or passenger motor vehicle, has an air inlet end for connection to a source of compressed air and an air outlet end for positioning inside the pneumatic tyre. A valve stem is furthermore provided between the air inlet and air outlet ends, with a thread for a union nut on its outside circumference. The valve stem has a collar for the rim well carrying the pneumatic tyre at its air outlet end and a threaded bore for fastening of an air pressure sensor positioned inside the pneumatic tyre. The valve stem may in principle also carry any other device instead of the air pressure sensor.

The union nut of the tyre valve has an inside thread screwing onto the outside thread of the valve stem to thereby clamp the rim well between the union nut and the valve stem collar after pushing the valve stem through a hole in the rim such that its air inlet end will be on the one side of the rim or rim well and the air outlet end on the other before screwing the union nut over the outside thread of the valve stem.

The tyre valve according to the invention furthermore has a plastic valve cap screwed onto or capable of screwing onto the air inlet end of the valve stem.

Because the valve cap is therefore not of metal, corrosion problems will be avoided. The air inlet end of the valve stem will therefore be threaded to receive the valve cap. The valve cap has a maximum outside diameter, i.e. the maximum diameter of a valve cap with a cylindrical outer circumference will be the diameter of that cylinder or, should the outside circumference of the valve cap vary, then the relevant outside diameter will be the largest outside diameter of the valve cap.

As with the aforementioned state of the art, a deformation element is provided on the outer circumference of the valve stem and/or the inner circumference of the union nut. The deformation element is designed to deform as the union nut is screwed onto the valve stem. According to one embodiment of the invention, the deformation will be reversible, but irreversible according to another embodiment of the invention. The deformation element is designed to ensure that, after the union nut is initially screwed onto the valve stem applying a certain torque under which the deformation element prevents rotation of the union nut and valve stem relative to each other, the valve stem and union nut will at first together rotate or be rotatable relative to the rim well whilst the deformation element remains or largely remains without deformation but will thereafter, under relatively larger torque, deform to cause or allow rotation of the union nut relative to the valve stem. This will allow a corresponding fastening screw or fastening nut to screw into or onto the fastening thread at the air outlet end of the valve stem, thereby enabling fastening the air pressure sensor or other device to the valve stem as well as fastening the tyre valve to the rim well to be effected from the air inlet end of the valve stem, with no counter element required for the fastening screw or fastening nut.

According to the invention the union nut and, with the deformation element located at the inside circumference of the union nut, also the deformation element, will have a minimum inside diameter larger than the maximum outside diameter of the valve cap.

It will therefore be possible despite the deformation element provided on the valve stem, designed to interact with the inside diameter of the union nut to deform the deformation element, or, with the embodiment where the deformation element is provided on the inside diameter of the union nut, despite the deformation element protruding radially inward, to screw the union nut onto the valve stem without removing the valve cap screwed onto the valve stem.

The solution according to the invention will enable delivering tyre valves to tyre fitters, especially fitters of large numbers of tyres, with the valve caps screwed on, thereby allowing the tyre fitter to fit the air pressure sensor to the tyre valve or valve stem without first removing the valve cap. The tyre can then be pressurised using a so-called tyre filling bell, as is common in large series, without the use of the tyre valve. Tyres are rather filled via the rim, or tyre edge. Compared to conventional embodiments, the fitter will therefore save himself screwing the valve cap off and then on again, resulting in considerable time saved when the number of tyres requiring fitting is high.

According to the invention, the valve cap will be made of plastic. Such plastic caps have advantages over metal caps in that they are cost-effective to manufacture and avoid corrosion between the valve stem that will generally be made of metal and the valve cap.

This type of corrosion may in practice create a permanent bond between valve cap and valve stem. Although such plastic valve caps will in practice exhibit larger diameters than metal valve caps, the invention enables fitment of air pressure sensors without first removing the valve caps. The valve cap may, for example, have a maximum outside diameter of 9 mm or more, especially 9.2 mm or more. The union nut and, where the deformation element is located on the inside circumference of the union nut, also the deformation element, may have a minimum inside diameter of 9.4 mm at least and/or in particular an inside diameter that is at least 0.2 mm larger than the maximum outside diameter of the valve cap.

According to one embodiment of the invention, the deformation element will be positioned directly on the outside thread or within the axial section of the outside thread of the valve stem. According to another embodiment, the deformation element will be positioned directly on the inside thread or within the axial section of the inside thread of the union nut. Both embodiments will result in positioning on an average axial section of the thread. According to an alternative embodiment of the invention, the deformation element will be positioned at the air inlet side or air outlet side of the union nut inside thread or the valve stem outside thread.

In some of the mentioned embodiments the deformation element will deform relatively soon after starting to screw the union nut onto the valve stem, generally causing more intensive deformation. In other embodiments, however, deformation will occur only after the union nut has been fully or almost fully screwed onto the valve stem, generally causing less intensive deformation.

According to an advantageous embodiment of the invention, the deformation element will be implemented as an elastic and/or plastically deformable ring. The ring may be made of plastic or rubber, for instance, but other materials, such as aluminium, may also be used. This will achieve the desired deformation characteristics and also, in particular, create a seal.

To allow particularly simple fitment of the ring onto the valve stem or into the union nut and for possible replacement with a new ring, it would be advantageous for the ring to be split along its circumference, especially with just one split.

According to an alternative embodiment, the ring will have a closed circumference. The ring may, for instance, be manufactured from an elastomer.

One embodiment of the invention provides for the deformation element being implemented as a coating on the outside circumference of the valve stem and/or the inside circumference of the union nut, wherein the coating may be implemented as a single section or point on the circumference, as a closed ring over the circumference or as a coating distributed over the circumference in the form of individual sections or points on the circumference. This type of coating may include, for example, polyamide or modified polyamide. Other materials, especially plastics such as PTFE, are also possible.

An advantageous embodiment of the invention provides that an annular groove be provided on the outside circumference of the valve stem or the inside circumference of the union nut into which the ring has been or may be inserted. This will create an undercut to reliably hold the ring in position.

According to one embodiment of the invention, the deformation element will be detachable, i.e. detachable from the valve stem when arranged on the outside circumference of the valve stem and detachable from the union nut when arranged on the inside circumference of the union nut. The deformation element may alternatively also be an integral part of the valve stem or union nut or be joined to form an integral part to thereby create a particularly secure grip. The latter type is particularly suitable if the deformation of the element is reversible, i.e. it may be used to screw the union nut onto the valve stem several times.

According to a particularly advantageous embodiment of the invention the fastening thread on the air outlet end of the valve stem is in the form of a threaded bore and the air outlet end of the valve stem has an air pressure sensor in a housing fastened or capable of being fastened to the valve stem by means of a screw screwing or capable of screwing into the threaded bore, wherein the fastening screw in particular cannot be driven. It is known that such screws may be driven via a hexagon socket, hexagon screw head, Torx® or other method of transmitting torque exerted by a tool.

A particular advantage of the last mentioned embodiment is for the threaded bore to lead into an air passage between air inlet end and air outlet end to allow compressed air to be pumped into the pneumatic tyre from the air inlet end through the fastening screw which will be designed as a hollow screw.

It will also be possible, however, to use a solid instead of a hollow screw for fastening and to provide in addition to the threaded bore another bore in the valve stem as the air outlet, especially at an angle inclined or at right angles to the latter.

The invention will be described below on the basis of examples of embodiments and the figures.

Figure 2:
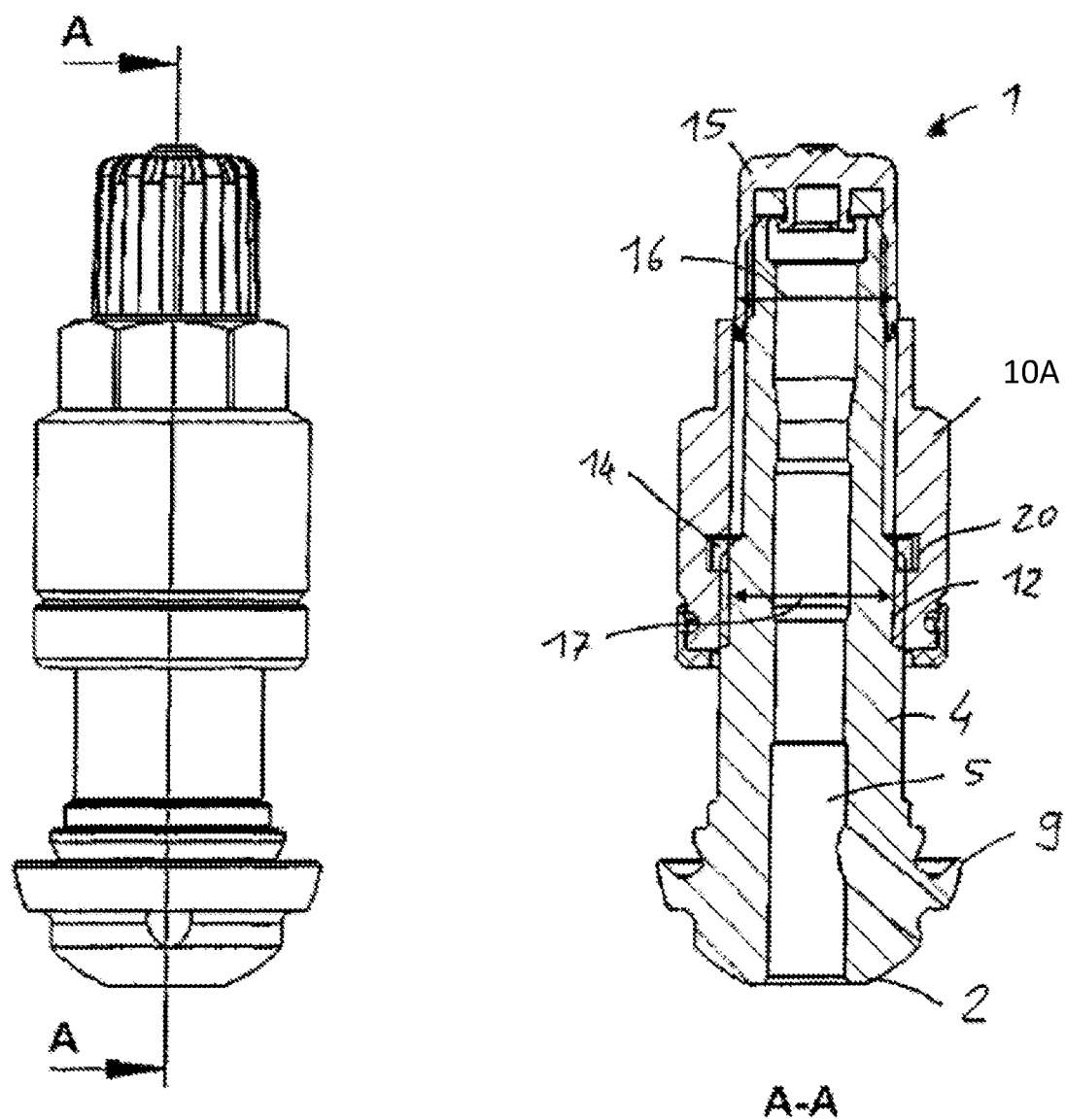
Figure 3:
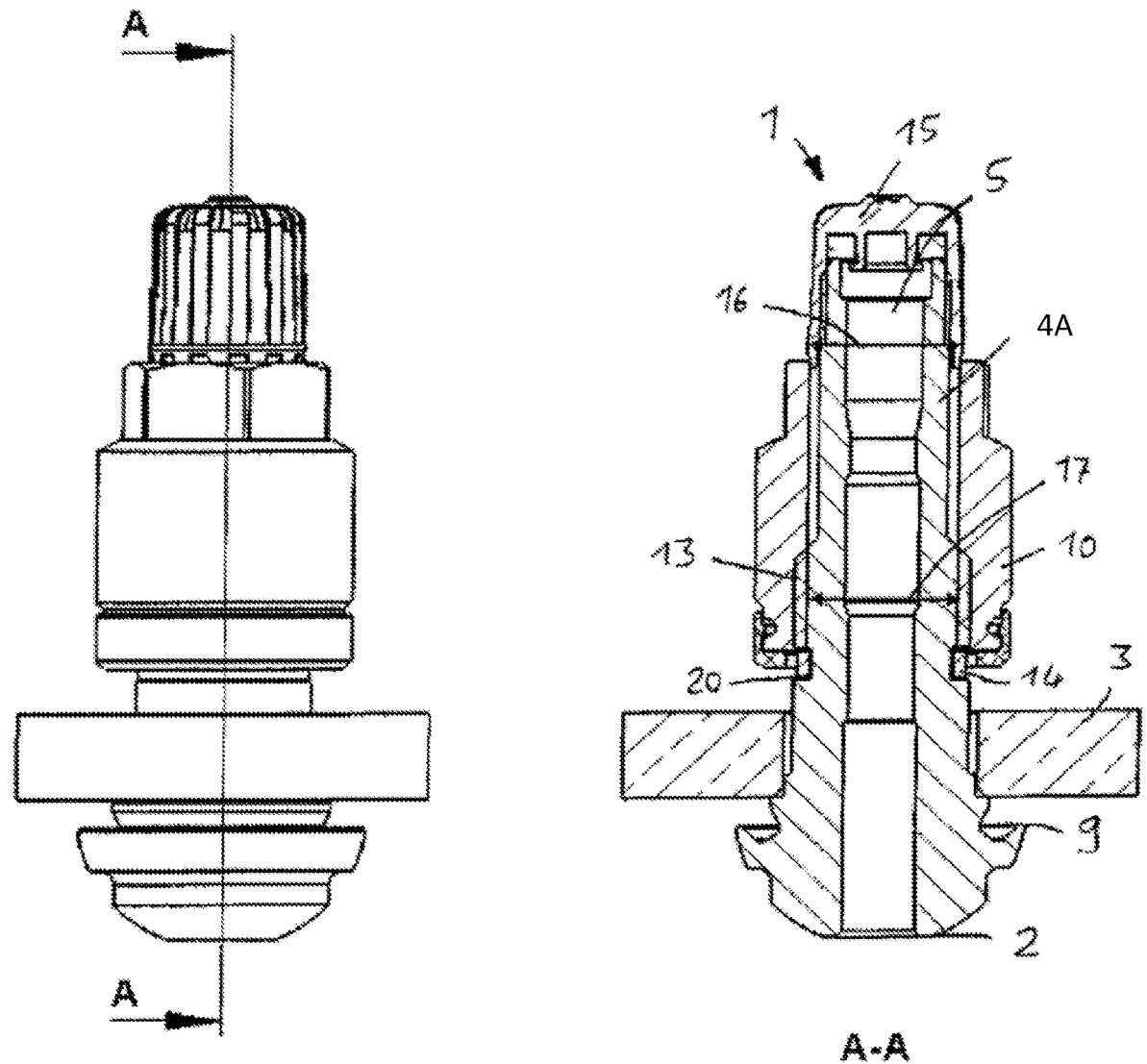
Figure 4:
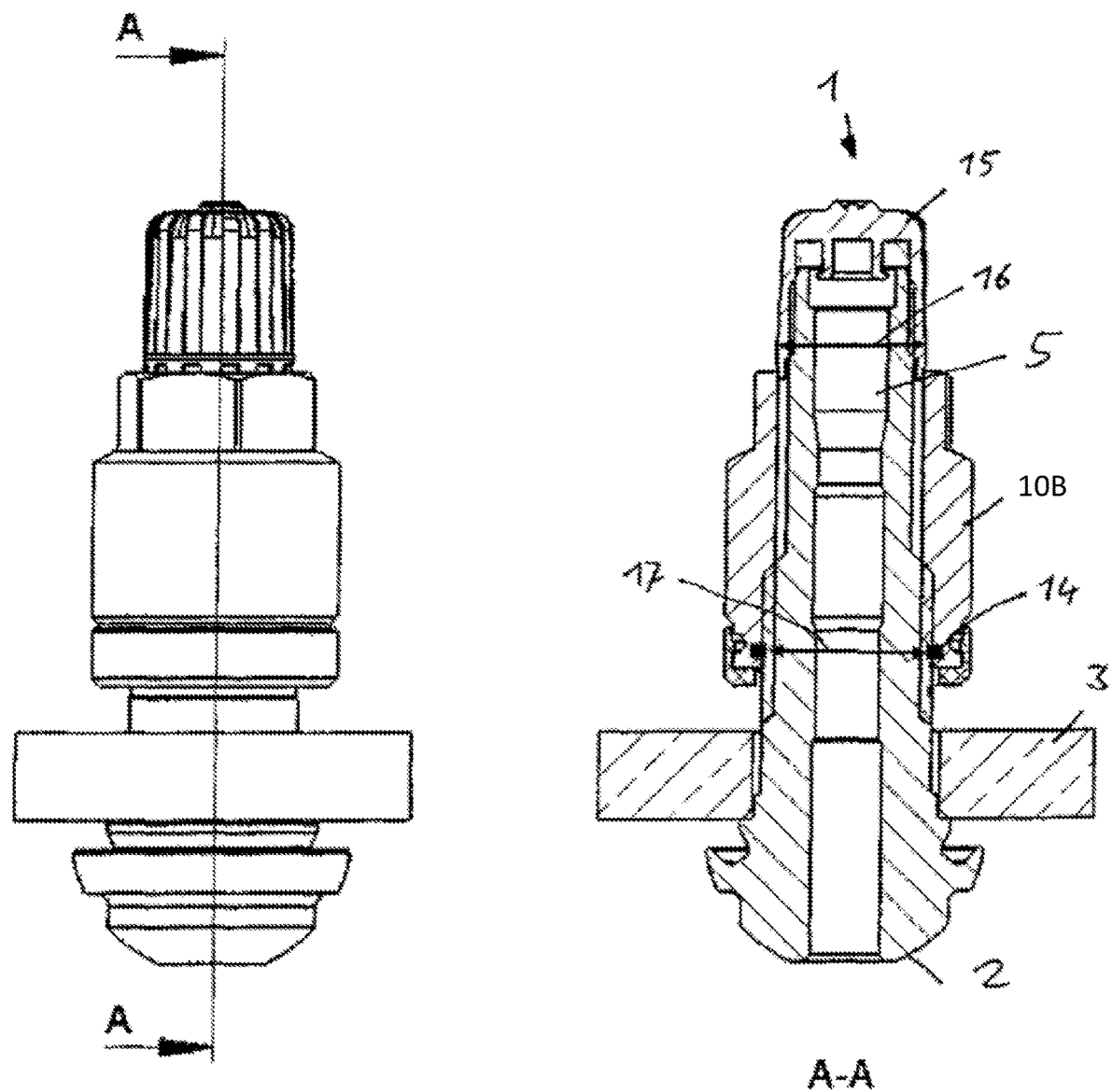

The figures show:

FIG. 1 a first example of an embodiment of the invention as viewed from the side and an axial section cut;

FIG. 2 an alternative embodiment of the invention with views as in FIG. 1;

FIG. 3 another alternative embodiment of the invention, with corresponding views;

FIG. 4 a fourth possible embodiment of the invention, again with corresponding views.

FIG. 1 shows a tyre valve according to the invention comprising an air inlet end 1 and an air outlet end 2. The air inlet end 2 is positioned on the side of the rim well 3 that will face the inside of the fitted pneumatic tyre (not shown).

As shown only schematically in the side view, FIG. 1, a fastening screw 7 screwing into a fastening thread 8 at the air outlet end 2 of the valve stem 4 will fasten an air pressure sensor 6 at the air outlet end 2 of the tyre valve or its valve stem 4, the latter exhibiting an air passage 5 extending from air inlet end 1 to air outlet end 2. Item 6 could, however, depict any other device that may need fastening to the tyre valve.

Valve stem 4 has a collar 9 to pull the valve stem 4 against rim well 3 as union nut 10 is screwed onto valve stem 4. Union nut 10 will to this end have a corresponding means for driving, shown here, for example, as external hexagon 11. Union nut 10 has an inside thread 12 and valve stem 4 a matching outside thread 13 to enable screwing on union nut 10. In the example of the embodiment shown in FIG. 1, deformation element 14 in the form of a ring has been fitted to the outside thread 13.

When screwing union nut 10 onto valve stem 4, the face of union nut 10 facing rim well 3 will initially abut deformation element 14, thereby blocking union nut 10 from screwing further down outside thread 13, thereby driving valve stem 4 in the same direction and driving fastening screw 7 into fastening thread 8 until air pressure sensor 6 rests tight against rim well 3 or the face end (air outlet end 2) of valve stem 4, whereafter fastening screw 7 is blocked from screwing down further into fastening thread 8. In general, to prevent fastening screw 7 from rotating in unison with valve stem 4, fastening screw 7 and the housing of air pressure sensor 6 should positively engage. Thereafter, as additional torque deforms deformation element 14 to exceed the corresponding breakaway torque and screw union nut 10 over deformation element 14, union nut 10 will tighten against rim well 3.

A valve cap 15 is screwed onto valve stem 4 at the air inlet end 1. Valve cap 15 has a maximum outside diameter 16 that is smaller than the minimum inside diameter 17 of union nut 10. This allows screwing union nut 10 onto valve stem 4 even with valve cap 15 already screwed onto valve stem 4. The outside diameter of deformation element 14 is correspondingly larger than the maximum outside diameter 16 of valve cap 15 to ensure proper interaction with the minimum inside diameter 17 of union nut 10.

Union nut 10 in the example of an embodiment exhibits a coating or cover 18 at its end abutting rim well 3, i.e. at least on its relevant face, to facilitate tightening union nut 10 against rim well 3 without damaging the surface of the latter and/or to create a corresponding seal. This is not absolutely necessary, however.

The embodiment shown in FIG. 1 furthermore shows a passage 19 branching off from air passage 5 at air outlet end 2, allowing the use of a solid instead of hollow fastening screw 7. Again, this is an arbitrary choice.

The embodiment as shown in FIG. 2 differs from that in FIG. 1 in that deformation element 14 is arranged inside an annular groove 20 on the inside of union nut 10A. The annular groove shown in the embodiment is arranged at the end of the inside thread 12 facing away from air outlet end 2. Again, this is an arbitrary choice. The annular groove 20 could, for instance, also be provided within the axial region of inside thread 12 or at the other end of inside thread 12. The minimum inside diameter 17 of union nut 10 and, in this example of an embodiment, also that of deformation element 14 will again be larger than the maximum outside diameter 16 of valve cap 15.

FIG. 2 does not show the fastening thread and screw and the air pressure sensor.

The example of an embodiment shown in FIG. 3 differs from previously shown embodiments in that deformation element 14 is positioned at the end of union nut 10 facing rim well 3, here in an annular groove 20 in valve stem 4. Union nut 10 will therefore not come to rest against deformation element 14 before it is fully screwed over the outside thread 13 of valve stem 4A. Valve cap 15 again has a maximum outside diameter 16 that is smaller than the minimum inside diameter 17 of union nut 10.

No passage branching from air passage 5 in the region of air outlet end 2 is provided here, as opposed to the embodiments in FIGS. 1 and 2. This is not absolutely necessary, however.

Deformation element 14 in the embodiment shown in FIG. 4 is positioned at the end of union nut 10 facing rim well 3 and attached to said union nut 10B, for instance in an annular groove. The minimum inside diameter 17 of union nut 10B and also that of deformation element 14 will therefore exceed the maximum outside diameter 16 of valve cap 15.

The invention claimed is:

1. A tyre valve for a pneumatic tyre of a vehicle, comprising:
    an air inlet end for connection to a source of compressed air and an air outlet end for positioning within a pneumatic tyre;
    a valve stem extending from the air inlet end to the air outlet end and having
        an outside thread on an outer surface of the valve stem,
        a collar at the air outlet end configured to accommodate a rim well carrying the pneumatic tyre, a fastening thread on an inner surface of the valve stem at the air outlet end;

a valve cap that is or can be screwed onto the valve stem at the air inlet end, the cap having a maximum outer diameter;

a union nut with an inside thread formed on an inner surface of the union nut and dimensioned for the union nut to be screwed onto the outside thread to clamp the rim well between the union nut and the collar, with the valve stem being inserted through a rim bore, wherein the union nut has a minimum inner diameter that exceeds the maximum outer diameter of the valve cap;

an annular groove formed either in an inner surface of the union nut at the inside thread, or in the outer surface of the valve stem at a location defined between the air inlet at an outer surface of the rim well, and a deformation element disposed in said annular groove and configured as
   a) an elastically-deformable ring to be reversibly deformed or
   b) a plastically-deformable ring to be irreversibly deformed in said annular groove when the union nut is screwed onto the valve such that at an initial bolting torque, a face of the union nut initially abuts the deformation element, and the valve stem is initially rotatable together with the union nut relative to the rim well with the deformation element being substantially deformation-free, and at a subsequent bolting torque, which is greater than the initial bolting torque, the union nut is rotatable relative to the valve stem with the deformation element being deformed in said groove.

2. The tyre according to claim 1, wherein said location is on the outside thread of the valve stem.

3. The tyre valve according to claim 1, wherein the ring is split on its circumference.

4. The tyre valve according to claim 1,
wherein
when the annular groove is formed in the inner surface of the union nut at the inside thread, the deformation element is detachable from the union nut, and when the annular groove is formed in the outer surface at said location, the deformation element is detachable from the valve stem.

5. The tyre valve according to claim 1, wherein the deformation element is materially bonded to the valve stem.

6. The tyre valve according to claim 1, wherein said inner surface of the valve stem is a surface of a longitudinal bore formed in the valve stem at the air outlet end and the fastening thread is dimensioned to mate with a fastening screw configured to fasten an air pressure sensor to the valve stem when the air pressure sensor is disposed inside the pneumatic tyre.

7. The tyre valve according to claim 6,
comprising said fastening screw,
wherein the longitudinal bore leads into an air passage extending through the valve stem from the air inlet end to the air outlet end and
wherein the fastening screw is designed as a hollow-core screw.

8. The tyre valve according to claim 1, wherein the maximum
outer diameter of the valve cap is at least 9 mm.

9. The tyre valve according to claim 1, configured to be operable in cooperation with a rim of a wheel of a utility motor vehicle or a passenger motor vehicle.

10. The tyre valve according to claim 1, wherein the deformation element is said ring made of plastic or rubber.

11. The tyre valve according to claim 1, wherein said ring is split on its circumference with just one split.

12. The tyre valve according to claim 1, wherein
the annular groove is formed at the outer surface at said location and said deformation element is configured to be reversibly or irreversibly deformed in said annular groove when the union nut is screwed onto the valve stem to press an end of the union nut, which end is proximal to the rim well, into said deformation element.

* * * * *